UNITED STATES PATENT OFFICE.

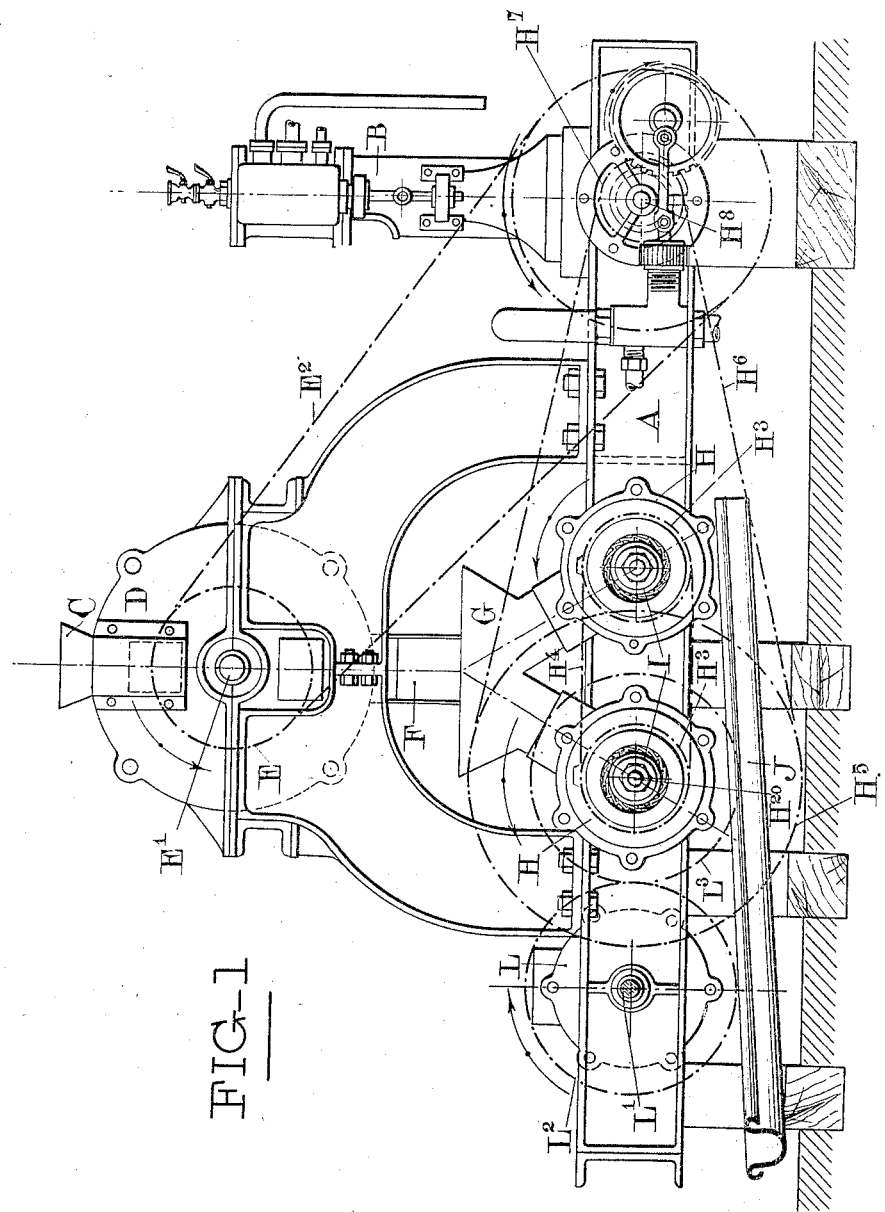

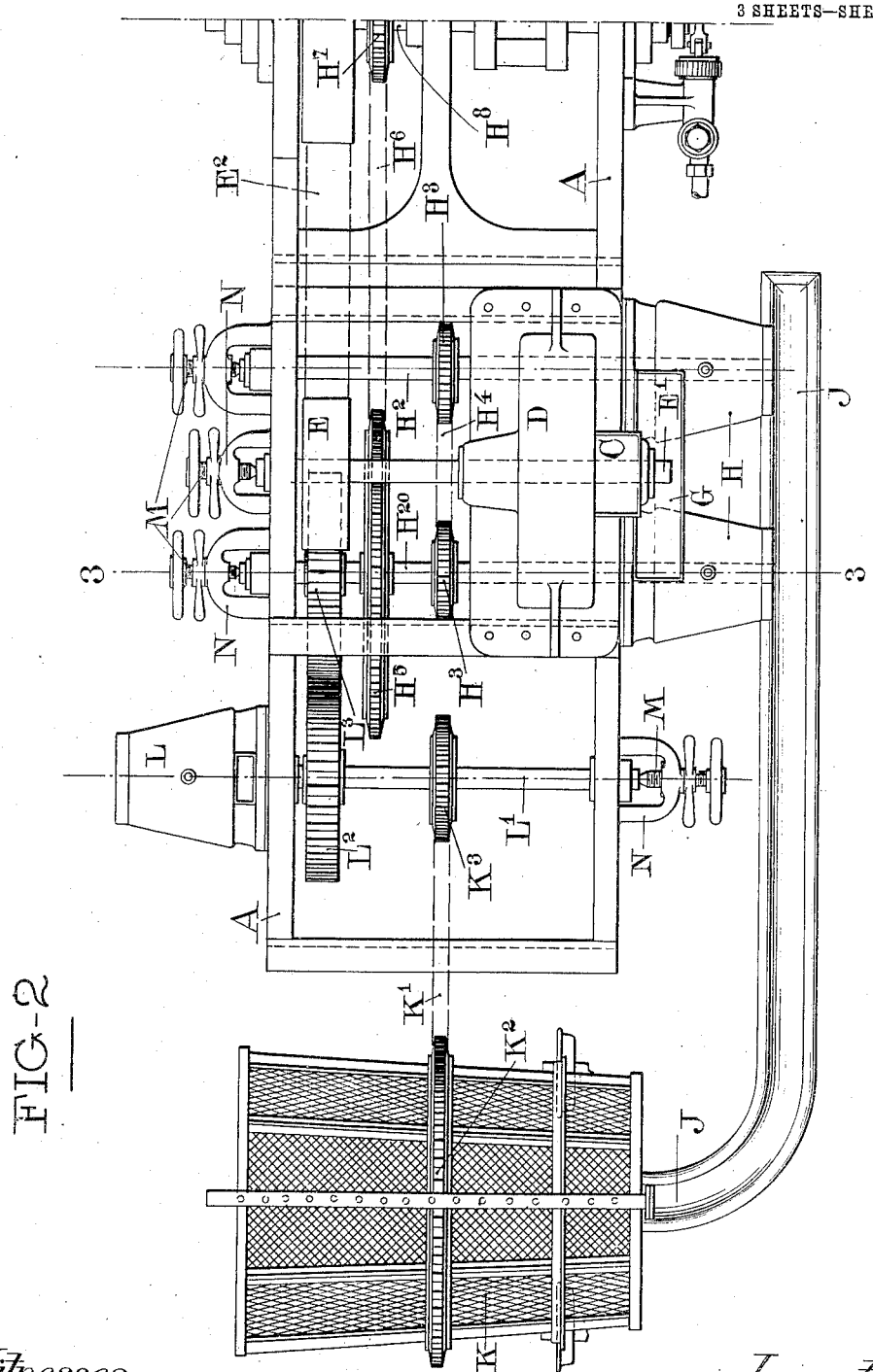

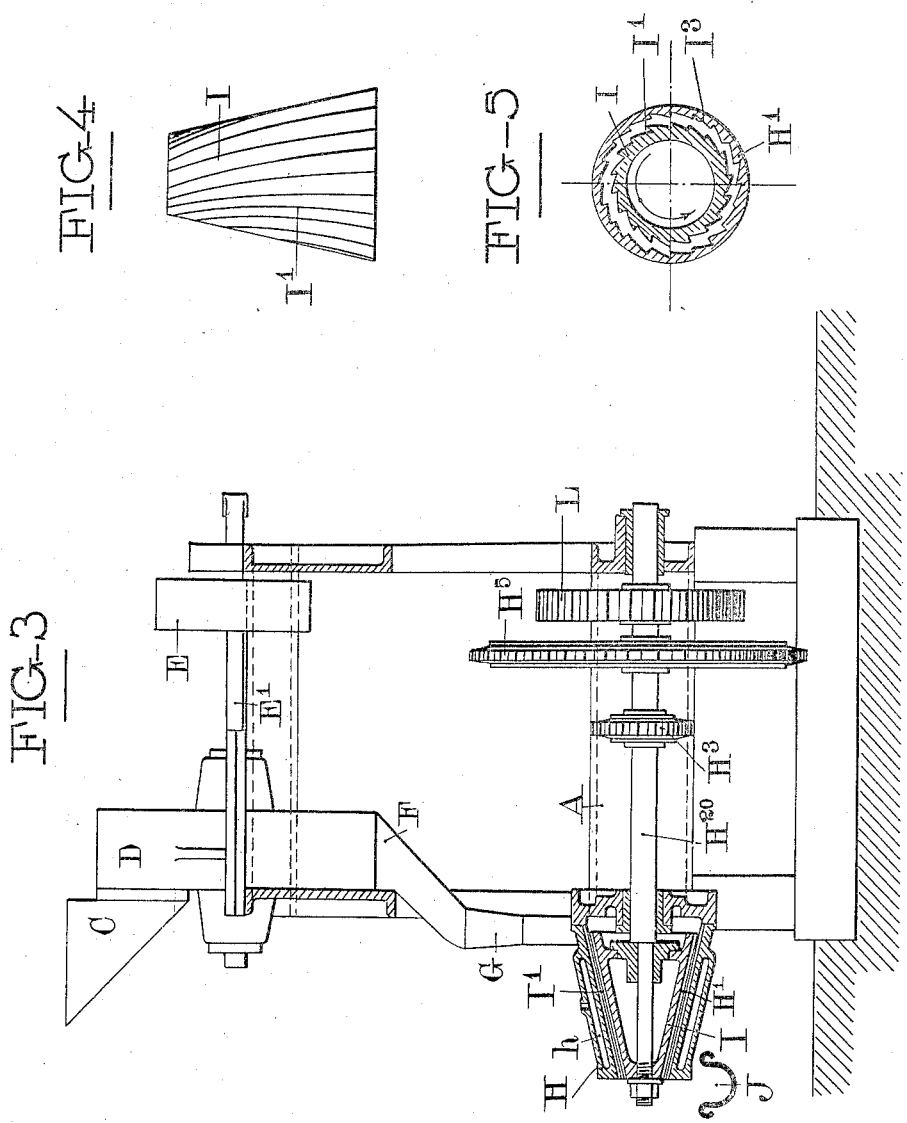

LÉON GUIGUET, OF LYON-VILLEURBANNE, FRANCE, ASSIGNOR TO LA SOCIÉTÉ POUR L'EXPLOITATION DU CAOUTCHOUC AU CONGO, OF LYON-VILLEURBANNE, FRANCE.

APPARATUS FOR EXTRACTING RUBBER.

958,918.  Specification of Letters Patent. Patented May 24, 1910.

Application filed May 1, 1909. Serial No. 493,336.

*To all whom it may concern:*

Be it known that I, LÉON GUIGUET, a citizen of the French Republic, residing at Lyon-Villeurbanne, in France, have invented certain new and useful Improvements in Apparatus for Extracting Rubber, of which the following is a specification.

This invention relates to apparatus for the extraction of rubber or other gums from plants, barks and fibers.

The improved apparatus comprises a combination of parts for the purpose of submitting the barks or fibers containing the rubber to a series of operations by which the rubber is dissociated and its molecules agglomerated to produce a substantially hard mass which has only to be submitted to the ordinary process of vulcanization. The different operations succeed one another in a continuous and automatic manner. The barks or fibers fed into a hopper are first crushed in contact with water to form a kind of paste which falls into a scutching and compressing device of special construction wherein it is acted upon by a current of water or other liquid and also to the action of heat. The water carries away the waste wood, bark or other foreign substances while the particles of rubber softened by the action of the heat acquire an affinity or adhesive property which causes them to become agglomerated. The action of the scutching and compressing device or agglomerator is an important feature of the invention and includes means for producing numerous cuts in the mass dealt with thus repeatedly opening the cells to release the foreign substances which are carried away by the current of water. On leaving the agglomerator the rubber is discharged into a drum in which it is washed with water then conducted into a final agglomerator which renders it more compact and hard, leaving said latter agglomerator in a condition ready to be vulcanized or to be submitted to other usual treatment.

An embodiment of the invention is represented in the annexed drawings in which,

Figure 1. is an elevation of the apparatus. Fig. 2. is a plan view thereof. Fig. 3. a section taken on the line 3—3 of Fig. 2. and, Figs. 4 and 5 illustrate in plan view and vertical section respectively, one of the cones of the agglomerator hereinafter referred to.

On the frame A are mounted, the extracting apparatus and the operating engine B therefor.

The rubber containing plant, bark or fiber to be treated is introduced into the hopper C from which it passes into the crusher D, comprising a fixed plate provided with teeth in front of which rotates a similar plate mounted on shaft $E^1$ on which is mounted a pulley E driven from the engine B by the belt or the like $E^2$. A current of water introduced into the crusher D facilitates the action therein and carries away the pulverized substances which pass out through the channel F to a two way funnel G which conducts the material to the agglomerators H. The latter each comprise a cone I provided with helicoidal grooves $I^1$ of similar shape to ratchet teeth. These cones rotate within conical sleeves $H^1$ provided with similar but oppositely formed grooves $I^3$. In the construction shown in Fig. 5. the cone I rotates in the direction of the arrow, the substance is first torn between the points of the teeth $I^1$ and $I^3$, and then compressed, rolled and flattened between the sides of said teeth. The organic or other substances are carried away by a current of water which is caused to circulate between the cones and the sleeves while the rubber, owing to its special properties agglomerates into more or less compact masses, by reason of the pressure to which it is subjected during its passage between the teeth and by the reduction in size of the outlet at the smaller ends of the cones. In order to facilitate the agglomeration of the rubber the sleeves $H^1$ are provided with double walls separated by a space $h$, Fig. 3, in which a suitable heating medium as steam or hot water can be caused to circulate. On leaving the agglomerators H the products pass into a trough J which conducts them into a rotating drum K in which the organic substances finely divided by the first operation are carried away by a current of water, while the rubber collecting in larger masses is recovered at its outlet. The rubber is then conducted to a final agglomerator L constructed similarly to those described and which is preferably heated and in which a current of water circulates in order to remove the final impurities while the rubber is agglomerated into larger masses than in the previous agglomerators.

The various agglomerators are mounted on axles driven by chain wheels, for example the devices H are actuated by shafts H² H²⁰ on which are mounted chain wheels H³ coupled by chain H⁴ one of said shafts carrying another chain wheel H⁵ driven by chain H⁶ from a wheel H⁷ on the driving shaft H⁸. The device L is actuated by shaft L¹ geared to the shaft H²⁰ by means of spur gear L². L³, and the drum K is actuated by chain and chain wheels K¹. K². K³ from the shaft L¹. Adjustment screws M carried by frames N are provided for regulating the distance between the cones I and the sleeves H¹ by shifting the shaft's axles of the cones.

The machine can also be used on plantations or at other places to extract and purify the rubber or other gums.

The shape and dimensions of the teeth of the agglomerators can be raised according to the nature of the substances to be treated.

What I claim as my invention and desire to secure by Letters Patent of the United States, is:—

1. In apparatus for the purpose specified the combination of a crushing device in which the raw material is reduced to a paste, an agglomerator in communication with said crusher in which the gum is separated from the inclosing material, means for supply of a current of liquid to said agglomerator for washing away foreign matter, means for supply of heat thereto for agglomerating the gum, an extracting and washing drum in communication with the gum discharge of the agglomerator and a further agglomerator in communication with said drum substantially as described.

2. In apparatus for the purpose specified the combination of a crushing device in which the raw material is reduced to a paste, an agglomerator in communication with said crusher and comprising relatively rotatable conical members and co-acting interior and exterior peripheral teeth on said members means for supply of a current of liquid to said agglomerator, means for supply of heat thereto, an extracting and washing drum in communication with the gum discharge of the agglomerator and a further agglomerator in communication with said drum substantially as described.

3. In apparatus for the purpose specified the combination of a crushing device in which the raw material is reduced to a paste, a plurality of agglomerators in communication with said crusher and each comprising relatively rotatable conical members and helicoidal interior and exterior peripheral teeth thereon between which the material is passed, means for supply of a current of liquid to said agglomerators means for supply of heat thereto, an extracting and washing drum, a trough communicating with the discharge of the agglomerators and said drum, a final agglomerator in communication with said drum and means for rotating the rotatable members of the agglomerators and the drum aforesaid, substantially as described.

4. In apparatus for the purpose specified, an agglomerator comprising a rotatable truncated conical core, having on its exterior periphery helicoidal teeth; a fixed sleeve surrounding said core having on its interior surface helicoidal teeth, the helices of which are of opposite direction to those of the core, the core and the sleeve being so arranged that an annular space remains between the teeth for the passage of the matter to be treated; means for introducing this said matter into the annular space at its greatest diameter and means for collecting said matter issuing through the smallest diameter of the annular space; means for passing a stream of water through said space and means for applying heat exteriorly to the sleeve.

In witness whereof I have signed this specification in the presence of two witnesses.

LÉON GUIGUET.

Witnesses:
 JEAN GERMAIN,
 GUILLAUME PIOCHE.